May 19, 1931.  G. W. ELSEY  1,806,338
PISTON
Filed March 21, 1929

Inventor
George W. Elsey

By
Spencer, Hardman and Fehr
Attorneys

Patented May 19, 1931

1,806,333

UNITED STATES PATENT OFFICE

GEORGE W. ELSEY, OF DAYTON, OHIO, ASSIGNOR TO DELCO PRODUCTS CORPORATION, OF DAYTON, OHIO, A CORPORATION OF DELAWARE

PISTON

Application filed March 21, 1929. Serial No. 348,910.

This invention relates to improvements in fluid displacement devices particularly adaptable for use in hydraulic shock absorbers.

It is among the objects of the present invention to provide a fluid displacement member of simple structure and design, adapted to permit fluid to flow therethrough in one direction only.

Further objects and advantages of the present invention will be apparent from the following description, reference being had to the accompanying drawings, wherein a preferred embodiment of one form of the present invention is clearly shown.

Figures 1, 2:
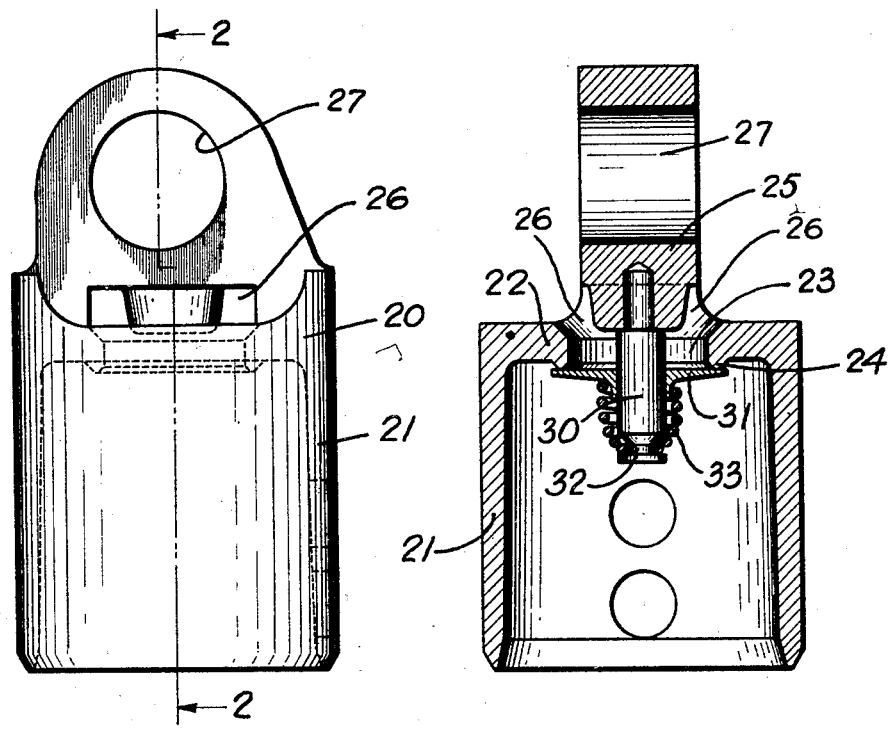
Fig. 1 is a side view of the fluid displacement member.
Fig. 2 is a sectional view taken along the line 2—2 of Fig. 1.
Figure 3:
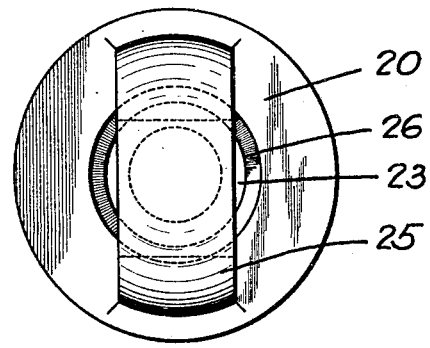
Fig. 3 is a top plan view of the fluid displacement member.

Referring to the drawings, the fluid displacement member comprises a main body portion 20 having a cylindrical skirt 21 and an end wall 22. In the end wall 22 there is provided an opening 23 substantially coaxial of the skirt portion 21. Surrounding the opening 23 and on the inner surface of the end wall 22 there is an annular ridge 24 having converging surfaces providing a comparatively sharp-edged valve-seat on the displacement member.

On the side of the end wall 22 opposite the valve-seat 24, an attachment lug 25 is provided, said attachment lug being cut away as at 26 to substantially bridge the opening 23 and thus forming passages 26 on each side of the lug which communicate with the opening 23 whereby provisions are made for the transfer of fluid from one side of the end wall 22 to the other when the fluid displacement member is being operated in a cylinder.

Lug 25 has a transverse opening 27 which, as viewed in Fig. 1, has its center offset from the plane passing through the axis of the skirt portion 21, which plane also passes through the center of the opening 23. It may be seen, however, that the plane at right angles to the aforementioned plane, or more specifically the plane passing through the axis of the fluid displacement member as viewed in Fig. 2 substantially bisects the lug 25 so that it may be said that when viewed in one direction the lug is centrally of the skirt portion 21, and when viewed on its broader side the lug 25 is offset from the coaxial plane of the skirt portion 21 of the fluid displacement member. This arrangement substantially reduces friction between the fluid displacement member and the wall of the cylinder in which it is reciprocated, especially when the stroke of the displacement member in the cylinder is comparatively long.

The lug supports a valve-pin 30 upon which the valve 31 is slidably carried. The free end of the piston pin 30 has an annular groove 32 in which one end of the spring 33 is seated, the other end of the spring engaging the valve 31, thus spring 33 yieldingly urges the valve 31 into engagement with the annular valve-seat 24.

The present invention provides a fluid displacement member of simple structure and design having an integral valve-seat member upon which a valve, supported within the fluid displacement member, is adapted yieldably to be seated.

While the form of embodiment of the present invention as herein disclosed, constitutes a preferred form, it is to be understood that other forms might be adopted, all coming within the scope of the claims which follow.

What is claimed is as follows.

1. A fluid displacement device comprising in combination, a main body portion having a passage therethrough; an attachment lug on said portion; a ridge surrounding the passage in the main body portion, said ridge presenting converging surfaces intersecting in a line, said line providing a valve-seat; and a valve supported by the lug and yieldably urged against the ridge.

2. A fluid displacement device comprising in combination, a main body portion having an end wall providing substantially parallel surfaces, said wall having a passage therethrough; an attachment lug on the outer surfaces of the end wall of said body portion; an annular ridge on the inner surface of the end wall of the said body portion, said ridge being coaxial of the passage through the end wall and presenting a valve-seat; and a valve movably supported by the lug and yieldably urged into engagement with the valve-seat.

3. A fluid displacement device comprising in combination, a cup-shaped body portion having a cylindrical skirt, and an end wall provided with an opening; a mounting lug on said end wall having an opening therein the center of which is offset from the axis of the cup-shaped body portion; a ridge on the end wall providing a valve seat about the opening therein; a valve-stem attached to the lug and extending through the opening in the end wall; a valve slidably supported upon the valve stem; and a spring yieldably urging the valve into engagement with the valve seat.

4. A fluid displacement device comprising in combination, a cup-shaped body portion having a cylindrical skirt and an end wall provided with an opening; a mounting lug on said end wall having the narrower side centrally disposed of one plane passing through the axis of the body portion, the axis of the broader side of the lug, however, being offset from the plane passing through the axis of the body portion at right angles to the aforementioned plane; a ridge on the end wall providing a valve-seat about the opening therein; a valve-stem attached to the lug and extending through the opening in the end wall; a valve slidably supported upon the valve-stem; and a spring yieldably urging the valve into engagement with the valve-seat.

In testimony whereof I hereto affix my signature.

GEORGE W. ELSEY.